(12) United States Patent
Lee et al.

(10) Patent No.: US 7,130,284 B2
(45) Date of Patent: Oct. 31, 2006

(54) DEVICE AND METHOD FOR PERFORMING HANDOFF FROM ASYNC MOBILE COMMUNICATION SYSTEM TO SYNC MOBILE COMMUNICATION SYSTEM

(75) Inventors: Kyung-Ha Lee, Seoul (KR); Sung-Bok Park, Kyonggi-do (KR)

(73) Assignee: Samsung Electronics Co., Ltd. (KR)

( * ) Notice: Subject to any disclaimer, the term of this patent is extended or adjusted under 35 U.S.C. 154(b) by 919 days.

(21) Appl. No.: 09/753,187

(22) Filed: Jan. 2, 2001

(65) Prior Publication Data

US 2001/0006515 A1 Jul. 5, 2001

(30) Foreign Application Priority Data

Dec. 30, 1999 (KR) ...................... 10-1999-0067039

(51) Int. Cl.
*H04Q 7/00* (2006.01)

(52) U.S. Cl. ...................... 370/331; 370/335; 370/342

(58) Field of Classification Search ................ 370/441, 370/442, 347, 342, 465, 331, 332, 333, 334, 370/335, 350, 503, 515; 375/130, 356; 455/421, 455/422.1, 432.1, 427, 428, 436, 437, 439, 455/440, 442, 443, 444, 445, 446, 450, 452.2, 455/456.1

See application file for complete search history.

(56) References Cited

U.S. PATENT DOCUMENTS 6,246,673 B1 * 6/2001 Tiedemann et al. ......... 370/333

6,307,840 B1 * 10/2001 Wheatley et al. ........... 370/252
6,567,480 B1 * 5/2003 Brardjanian et al. ........ 375/331

FOREIGN PATENT DOCUMENTS

| EP | 1 102 506 | 5/2001 |
|---|---|---|
| EP | 1 104 974 | 6/2001 |
| JP | 06-029923 | 2/1994 |
| JP | 07-222227 | 8/1995 |

(Continued)

OTHER PUBLICATIONS

European Search Report for EP Appln. No. 00128708.5.

(Continued)

*Primary Examiner*—Ajit Patel
(74) *Attorney, Agent, or Firm*—Dilworth & Barrese LLP

(57) ABSTRACT

Disclosed is a method for performing a handoff from an async base station to a sync base station when a mobile station with async and sync demodulation modules travels from a present cell of the async base station to a cell of the sync base station, the method including the steps of: the mobile station driving the sync demodulation module for a given idle sleep time to acquire and maintain the timing of the sync base station, during an operation in the cell of the async base station; during the handoff, the mobile station measuring the strengths of pilot signals from the adjacent sync base stations based on the acquired timing, and sending the measurement results to the async base station; the mobile station receiving from the async base station information necessary to establish a traffic channel with the sync channel; and the mobile station performing handoff to the sync base station according to the information necessary to establish the traffic channel.

1 Claim, 6 Drawing Sheets

FOREIGN PATENT DOCUMENTS

| | | |
|---|---|---|
| JP | 11-088945 | 3/1999 |
| JP | 2001-169330 | 6/2001 |
| WO | WO 94/29981 | 12/1994 |
| WO | WO 99/20074 | 4/1999 |
| WO | WO 99/25137 | 5/1999 |
| WO | WO 99/49609 | 9/1999 |
| WO | WO 99/55104 | 10/1999 |
| WO | WO 00/74275 | 12/2000 |

OTHER PUBLICATIONS

Japanese Office Action dated Mar. 23, 2004 issued in a counterpart application, namely, Appln. No. 2000-402902.

"Harmonized Global 3G (G3G) Technical Framework for ITU IMT-2000 CDMA Proposal", 3GPP TSG-T#4, Miami, US, Jun. 17-18, 1999.

* cited by examiner

DEVICE AND METHOD FOR PERFORMING HANDOFF FROM ASYNC MOBILE COMMUNICATION SYSTEM TO SYNC MOBILE COMMUNICATION SYSTEM

PRIORITY

This application claims priority to an application entitled "Device and Method for Performing Handoff from Async Mobile Communication System to Sync Mobile Communication System" filed in the Korean Industrial Property Office on Dec. 30, 1999 and assigned Serial No. 99-67039, the contents of which are hereby incorporated by reference.

BACKGROUND OF THE INVENTION

1. Field of the Invention

The present invention relates generally to a device and method for performing handoff in a mobile communication system, and more particularly, to a novel device and method for implementing handoff when a mobile station travels from a cell of the async mobile communication system to a cell of the sync mobile communication system.

2. Description of the Related Art

The async mobile communication system is a system including a terminal operating in accordance with the IMT-2000 specification being standardized in 3GPP (third generation partnership project). The sync mobile communication system is a system operating in accordance with the IMT-2000 specification being standardized in 3GPP2, and includes IS-95 and J-STD008, the next generation sync systems. These two systems are becoming increasingly harmonized and there is thus a need for various technologies that are compatible with both systems. One of such technologies is related to handoff that may happen between the sync mobile communication system and the async mobile communication system.

Handoff is a technology that enables users to continuously receive call service without interruption when a mobile station travels from a present cell to an adjacent cell during the call service in a mobile communication system. Handoffs are classified as soft hand off and hard hand off. In the soft hand off, the mobile station maintains a call using both a channel assigned by a target base station and a channel assigned by the present base station in service. Eventually, the mobile station abandons one of the two channels, whose quality has a value lower than a threshold. In the hard hand off, a channel assigned by the present base station in service is first released, and then connection to an adjacent base station is attempted.

Until now, development of the handoff has been concentrated on the sync mobile communication system. But, with the emergence of the async mobile communication system, research has been undertaken regarding handoff between sync and async mobile communication systems.

The mobile station usually acquires information about adjacent cells and informs the base station of the information when a pilot signal received from one of the adjacent cells has a higher strength than a threshold or a handoff direction message is received from the base station. The information sent to the base station is used as information about the handoff performed when the mobile station travels from a present cell to the adjacent cell during a call service. A hard handoff takes place normally when the mobile station travels from a cell of the async mobile communication system to a cell of the sync mobile communication system. For the hard handoff, the mobile station interrupts a call service from the async mobile communication system while it acquires information about the adjacent cells.

Conventionally, the mobile station has to perform the following procedure in order to interpret information about the sync mobile communication system. First, the mobile station interprets a sync signal message stored in the sync signal frame transferred from the sync channel of the sync mobile communication system. The transmission bit per 80 ms frame of the sync signal frame is 96 bits, and the sync signal message including information the mobile station can communicate with the sync mobile communication system, has a length of 221 bits. Thus the mobile station needs at least 240 ms (80 ms×3) for interpreting the message. The above-mentioned specifications are included in the TIA/EIA-IS-2000.5 standard that define the sync mobile communication system.

Hereinafter, a base station of the sync mobile communication system will be referred to as "sync base station" and a base station of the async mobile communication system will be called "async base station".

FIG. 2 illustrates a procedure for the mobile station in communication with a present async base station to acquire information about the adjacent sync base stations. Referring to FIG. 2, the mobile station receives from an async base station a direction message to detect information about sync base stations adjacent to the async base station, in step 201. Then, the mobile station sets to detect information about the adjacent sync base stations in step 203, and detects pilot signals from the adjacent sync base stations in step 205. The mobile station determines in step 207 whether a pilot signal having a highest peak value is detected. Upon failure to detect such a pilot signal of highest peak value, the mobile station returns to step 205. If a highest peak value of a pilot signal is detected, the mobile station proceeds to step 209 to receive sync frames through the forward sync channel of the sync base station from which the pilot signal having the highest peak value has been detected. In this case, the mobile station has to receive at least three sync frames from the sync base station in order to receive all sync signal messages. For example, the mobile station takes at least 240 ms in receiving the sync frames from the sync base station having a channel structure shown in FIG. 1 and, during the frame reception time, interrupts the communication with the async base station. Taking a long time in performing the procedure of FIG. 2 may therefore result in a detrimental effect such as a loss of data communicated between the async base station and the mobile station. Moreover, the mobile station does not necessarily receive messages at the time when it begins to receive the sync frames. Including the time of waiting for the time in the unit of 240 ms, the mobile station has to interrupt communication with the async base station for about 513.3 ms on the assumption that there is no error in the received frames. Therefore, a loss of data communicated between the sync base station and the mobile station is inevitable if the mobile station takes a long time in performing the procedure of FIG. 2. This does not meet the compressed mode defined in the async system in order to monitor other frequency bands suggested in the async standards.

FIG. 1 illustrates an exemplary construction of the respective channels communicated between a mobile station and a base station, and a channel communication device for the respective channels in a code division multiple access (CDMA) communication system, which is one of the sync mobile communication systems according to the prior art. The respective channels shown in FIG. 1 are illustrated focusing on a transmitter.

To describe the channel construction of a base station, a controller 101 enables/disables an operation of the individual channel generators, processes a message communicated between a physical layer and the base station, and communicates messages with the upper layer. Pilot channel generator 103, sync channel generator 104, and paging channel generator 107 are devices for generating common channel information shared among the users in a single cell or a plurality of cells. Dedicated control channel (DCCH) generator 102, fundamental channel (FCH) generator 108 and supplemental channel (SCH) generator 109 are devices for generating dedicated channel information assigned differently to the users.

The dedicated control channel generator 102 processes various control messages received on a forward dedicated control channel DCCH and sends them to a mobile station. The messages on the forward dedicated control channel include radio link protocol (RLP) frames or various control messages used in the IS-95B standard, and medium access control messages (MAC) related to a packet data service control, i.e., assigning or releasing supplemental channels. Power control signals can be transmitted on the dedicated control channel instead of the fundamental channel, in which case the power control signals are included in the control messages. On the forward dedicated control channel, the dedicated control channel generator 102 negotiates with the base station in regard to a data rate to be used for a supplemental channel or, if orthogonal codes are used for the supplemental channel, gives a direction to change the orthogonal codes. The forward dedicated control channel is spread with one of the unused orthogonal codes among those not assigned to the pilot channel generator 103, sync channel generator 104, or paging channel generator 107. The RLP frame provides a service for successful transmission of an octet stream. The RLP may be classified into transparent RLP and non-transparent RLP. The transparent RLP does not retransmit an erroneously transmitted frame but informs the upper layer of the time and position of the erroneously transmitted frame. The non-transparent RLP involves error correction.

The pilot channel generator 103 processes information received on a forward pilot channel and sends the received information to the mobile station. The forward pilot channel always transmits logic signals of all 0's or 1's. It is assumed herein that the pilot channel transmits logic signals of all 0's. The pilot channel signal enables the mobile station to rapidly acquire initial synchronization for new multiple paths and estimate channels. The pilot channel is spread with one specific orthogonal code previously assigned thereto.

The sync channel generator 104 processes information received on a forward sync channel and sends the received information to the mobile station. Information on the sync channel enables every mobile station in a cell to acquire initial time and frame synchronizations. The forward sync channel is spread with one specific Walsh code previously assigned thereto.

The paging channel generator 107 processes information received on a forward paging channel and sends the received information to the mobile station. Information on the paging channel is all information necessary prior to establishment of traffic channels. The forward paging channel is spread with one of orthogonal codes previously assigned thereto.

The fundamental channel generator 108 processes information received on a forward fundamental channel and sends the received information to the mobile station. Information on the forward fundamental channel may include a variety of control messages (L3 signaling) used in the IS-95B standard and power control signals, other than the voice signal. If necessary, such information may include RLP frames and MAC messages. The fundamental channel has a data rate of 9.6 kbps or 14.4 kbps and, according to circumstances, has a variable data rate such as 4.8 kbps or 7.2 kbps as ½ of the given data rate; 2.4 kbps or 3.6 kbps as ¼ of the data rate; or 1.2 kbps or 1.8 kbps as ⅛ of the data rate. Such a variable data rate must be detected by the receiving unit. The forward fundamental channel is spread with orthogonal codes not assigned to the pilot channel generator 103, sync channel generator 104, or paging channel generator 107.

The supplemental channel generator 109 processes information received on a forward supplemental channel and sends the received information to the mobile station. Information on the forward supplemental channel includes RLP frames, packet data and the like. The supplemental channel generator 109 has a data rate of more than 9.6 kbps. The supplemental channel generator 109 has a scheduled data rate, i.e., the base station communicates with the mobile station at a data rate determined under negotiation with the mobile station through the dedicated control channel. The forward supplemental channel is spread with orthogonal codes not assigned to the pilot channel generator 103, sync channel generator 104, or paging channel generator 107. The fundamental channel and the supplemental channel become traffic channels.

An adder 110 adds in-phase channel transmission signals on the forward link from dedicated control channel generator 102, fundamental channel generator 108 and supplemental channel generator 109 to transmission signals from pilot channel generator 103, sync channel generator 104 and paging channel generator 107. An adder 111 adds together quadrature-phase channel transmission signals output from dedicated control channel generator 102, fundamental channel generator 108 and supplemental channel generator 109. A spreading modulator 112 multiplies the transmission signals from the adders 110 and 111 by a spreading sequence and ascent frequency converts the transmission signals. A receiver 123 frequency converts the respective channel signals of the mobile station on the reverse link with a base band and then despreads the signals through multiplication of the converted signals by a spreading sequence. The construction of the reverse link channel receivers provided in the base station are omitted in FIG. 1.

Now to describe the channel construction of the mobile station, a controller 114 enables/disables the operation of the individual channel generators, processes a message communicated by the mobile station, and communicates messages with the upper layer.

A dedicated control channel generator 115 processes various control messages received on a reverse dedicated control channel and sends them to a base station. The messages on the reverse dedicated control channel include radio link protocol (RLP) frames or various control messages used in the IS-95B standard, and medium access control messages (MAC) related to a packet data service control, i.e., assigning or releasing supplemental channels. For a reverse link, power control signals are not separately transmitted on the dedicated control channel because they are inserted in a pilot channel for transmission. On the reverse dedicated control channel, the dedicated control channel generator 115 negotiates with the base station in regard to a data rate to be used for a supplemental channel. The reverse dedicated control channel generator 115 spreads the individual channels with unique orthogonal codes previously assigned thereto to discriminate the channels and spreads the signals from the users with unique PN codes to discriminate the users. Thus different orthogonal codes are assigned to a dedicated control channel, a pilot channel, an access channel, a fundamental channel and a supplemental channel in order to discriminate the respective channels, and the respective orthogonal codes used for every channel are shared among the users. For example, an orthogonal code used for the dedicated control channel is shared among all users to discriminate the dedicated control channel.

The reverse dedicated control channel has a fixed data rate of 9.6 kbps, which prevents any performance deterioration in determining the data rate and eliminates a data rate determination circuit, reducing complexity of the receiver. Also, the reverse dedicated control channel has the same data rate as the basic data rate of voice signals, i.e., 9.6 kbps, thus maintaining the same service diameter as the basic voice service.

A pilot channel generator 116 processes information received on a reverse pilot channel and sends the received information to the base station. Like the forward pilot channel, the reverse pilot channel enables rapid acquisition of initial synchronization for new multiple paths and channel estimation. The reverse pilot channel also transmits reverse power control information by adding power control signals to the pilot signal at a defined time.

An access channel generator 117 processes information received on a reverse access channel and sends the received information to the base station. The information on the access channel includes control messages and all information about the mobile station required by the base station prior to establishment of a traffic channel.

A fundamental channel generator 118 processes information received on a reverse fundamental channel and sends the received information to the base station. Information on the reverse fundamental channel normally includes voice signals. Such information may include a variety of control messages (L3 signaling) used in the IS-95B standard as well as voice signals. If necessary, the information may include RLP frames and MAC messages. For a reverse link, power control signals are not separately transmitted on the access channel because they are inserted in the pilot channel for transmission. The fundamental channel has a fixed data rate of 9.6 kbps or 14.4 kbps and, according to circumstances, has a variable data rate such as 4.8 kbps or 7.2 kbps as ½ of the given data rate; 2.4 kbps or 3.6 kbps as ¼ of the data rate; or 1.2 kbps o kbps as ⅛ of the data rate. Such a variable data rate must be detected by the receiving unit. The reverse fundamental channel generator 118 spreads the individual channels with unique orthogonal codes previously assigned thereto to discriminate the channels and spreads the signals from the users with unique PN codes to discriminate the users. Thus different orthogonal codes are assigned to a pilot channel, an access channel, a fundamental channel and a supplemental channel in order to discriminate the respective channels and the respective orthogonal codes used for every channel are shared among the users. For example, an orthogonal code used for the fundamental channel is shared among all users to discriminate the fundamental channel.

A supplemental channel generator 119 processes information received on a reverse supplemental channel and sends the received information to the base station. Information on the reverse supplemental channel includes RLP frames, packet data and the like. The supplemental channel generator 119 has a data rate of more than 9.6 kbps. The supplemental channel generator 119 has a scheduled data rate, i.e., the base station communicates with the mobile station at a data rate predetermined through negotiation with the mobile station through the dedicated control channel. The reverse supplemental channel spreads the individual channels with unique orthogonal codes previously assigned thereto to discriminate the channels and spreads the signals from the users with unique PN codes to discriminate the users. The fundamental channel and the supplemental channel will become traffic channels.

An adder 120 adds together transmission signals on the reverse link received from the dedicated control channel generator 115 and the pilot channel generator 116. An adder 121 adds together transmission signals on the reverse link received from access channel generator 117, fundamental channel generator 118 and supplemental channel generator 119. A spreading modulator 122 multiplies the transmission signals from the adders 120 and 121 by a spreading sequence and ascent frequency converts the transmission signals. A receiver 123 frequency converts the respective channel signals of the mobile station on the reverse link with a base band and then despreads the signals through multiplication of the converted signals by a spreading sequence. The construction of the reverse link channel receivers provided in the mobile station are omitted in FIG. 1.

In the CDMA communication system, as shown in FIG. 1, the base station comprises controller 101, dedicated control channel generator 102, pilot channel generator 103, sync channel generator 104, paging channel generator 107, fundamental channel generator 108 and supplemental channel generator 109. The mobile station comprises controller 114, dedicated control channel generator 115, pilot channel generator 116, access channel generator 117, fundamental channel generator 118 and supplemental channel generator 119. For the output form of the individual channel generators in the base station, the signals from dedicated control channel generator 102, fundamental channel generator 108 and supplemental channel generator 109 are two channel signals, i.e., having an in-phase channel component and quadrature-phase channel component, while only one channel signal is generated from pilot channel generator 103, sync channel generator 104 and paging channel generator 107. It is assumed herein that the only one channel component is the in-phase channel component.

Unlike the channel generators of the base station, those of the mobile station generate only one channel component. Thus the outputs of the dedicated control channel generator 115 and the pilot channel generator 116 of the mobile station are added up and fed into the spreading modulator 122 as an in-phase channel, and the outputs of the remaining channel generators 117, 118 and 119 are added up and fed into the spreading modulator 122 as a quadrature-phase channel. When using the access channel, the output of the pilot channel generator 116 is an in-phase channel input and the output of the access channel generator 117 is a quadrature-phase channel input, since the access channel generator 117 generates the output prior to generation of the traffic channel.

FIG. 3 illustrates a handoff procedure according to the prior art when the mobile station travels from a cell of the async base station to a cell of the sync base station shown in FIG. 1.

Referring to FIG. 3, in step 301, mobile station B receives from async base station A a message including information about other base stations adjacent to the async base station A through a broadcast channel or a paging channel. In step 302, the mobile station B measures the reception strengths of pilot signals transferred from the adjacent base stations and sends a message including the measurement results of the pilot signals to the async base station A through a reverse dedicated channel. Then, the async base station A analyzes the message on the reverse dedicated channel to determine whether there is a target async base station. If a target async base station exists, the async base station A confirms the handoff; otherwise, it sets parameters T, $T_0$ and N for detecting the reception strength of the pilot signals from the adjacent sync base stations, where $T_0$ is a time to detect the pilot signal of a sync base station, T is a time interval for detecting the pilot signal of the sync base station, and N is a parameter defining the number of times for detecting the pilot signal of the sync base station. In step 303, the mobile station B receives a direction message on a forward dedicated control channel to measure the reception strength of the pilot signals of the async and sync base stations adjacent to the async base station A, and a message including the parameters. Upon receiving the message on the forward dedicated control channel, the mobile station B measures the reception strengths of the pilot signals from the sync and async base stations adjacent to the async base station A based on the parameters T, $T_0$ and N.

In step 306, the mobile station B detects a pilot signal received from the individual sync base stations adjacent to the async base station A. Here, the pilot signal enables the mobile station B to estimate the channels and rapidly acquire initial synchronization for new multiple paths. Besides detection of the pilot signal, the mobile station B analyzes in step 306 a sync message received from a sync base station such as sync base station C through a forward sync channel to recognize the sync base station C, and acquires system information about the sync base station C. The sync message includes system information necessary for communication with the sync base station C, such as system ID number, network ID number, PN_OFFSET value, long code information after 320 ms, and paging channel data rate. For example, the sync channel frame used in the IS-95 system is 80 ms in length with a data rate of 96 bits and comprises three sub frames having a length as long as one period of a short code. Here, the sync message including the system information about the sync base station C has a length of more than 200 bits including a message length field and CRC. Even when the message is less than 96 bits in length, the 80ms sync frame necessarily sends 96 bits by adding the surplus bits to the message. Thus the mobile station B must receive at least three 80 ms sync frames in order to receive all sync messages including the system information. Without errors in the sync messages, it takes at least 240 ms for the mobile station B to recognize the sync base station C and receive information of the sync base station C.

In step 304, the mobile station B sends a message, including the measurement results of the reception strength of the pilot signals received from the adjacent base stations and information about the sync message, to the async base station A through a reverse dedicated channel. Then, the async base station A analyzes the received message on the reverse dedicated channel and sends the measurement results to the upper network. The upper network checks the existence of the target sync base station C and sends to the async base station A a handoff direction message including information necessary for the handoff. In step 305, the mobile station B receives the handoff direction message including information about traffic channels for communication with the target sync base station C, through the forward dedicated channel from the async base station A. Once receiving the handoff direction message, the mobile station B prepares to receive traffic data from the sync base station C with reference to the traffic channel information included in the message. In step 308, the mobile station B receives null traffic or the like on a forward fundamental channel from the sync base station C to ensure stability of channels. The mobile station B receives in step 309 a traffic message on the forward fundamental channel from the sync base station C while moving to a cell of the target sync base station C, thereby switching a call service from the async base station A to the sync base station C. Thereafter, the mobile station B sends a preamble on a reverse fundamental channel to inform that transmission is successful, in step 310, and sends a handoff complete message on the reverse fundamental channel to the sync base station C, in step 311.

With the above-described forward channel structure of the conventional sync mobile communication system, the mobile station B must receive at least three sync frames on the forward sync channel of the sync mobile communication system. For example, a sync mobile communication system having the channel structure shown in FIG. 1 has a minimum reception time of 240 ms. Thus it will take at least 240 ms for the mobile station B to acquire system information for communication with the sync base station C while traveling from a cell of the async base station A to a cell of the target sync base station C. During this reception time, the mobile station interrupts communication with the async base station A. That is, taking a long time in performing the procedure of FIG. 3 results in a detrimental effect such as a loss of data communicated between the async base station and the mobile station.

SUMMARY OF THE INVENTION

It is therefore an object of the present invention to provide a device and method for acquiring and maintaining the timing information of a sync system prior to searching for adjacent sync systems or receiving a handoff indication message by a mobile station that is in communication with an async system.

It is another object of the present invention to provide a device and method for use with an async system previously sending information about adjacent sync base stations to a mobile station, whereby the mobile station can acquire a pilot offset, a zero offset PN code period and a PN long code of the sync base station prior to receiving a handover indication message.

To achieve the above objects of the present invention, there is provided a method for performing a handoff from an async base station to a sync base station when a mobile station with async and sync demodulation modules travels from a present cell of the async base station to a cell of the sync base station, the method including the steps of: the mobile station driving the sync demodulation module for a given idle sleep time to acquire and maintain the timing of the sync base station, during an operation in the cell of the async base station; during the handoff, the mobile station measuring the strengths of pilot signals from the adjacent sync base stations based on the acquired timing, and sending the measurement results to the async base station; the mobile station receiving from the async base station information necessary for establishing a traffic channel with the sync channel; and the mobile station performing handoff to the sync base station according to the information necessary for establishing the traffic channel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
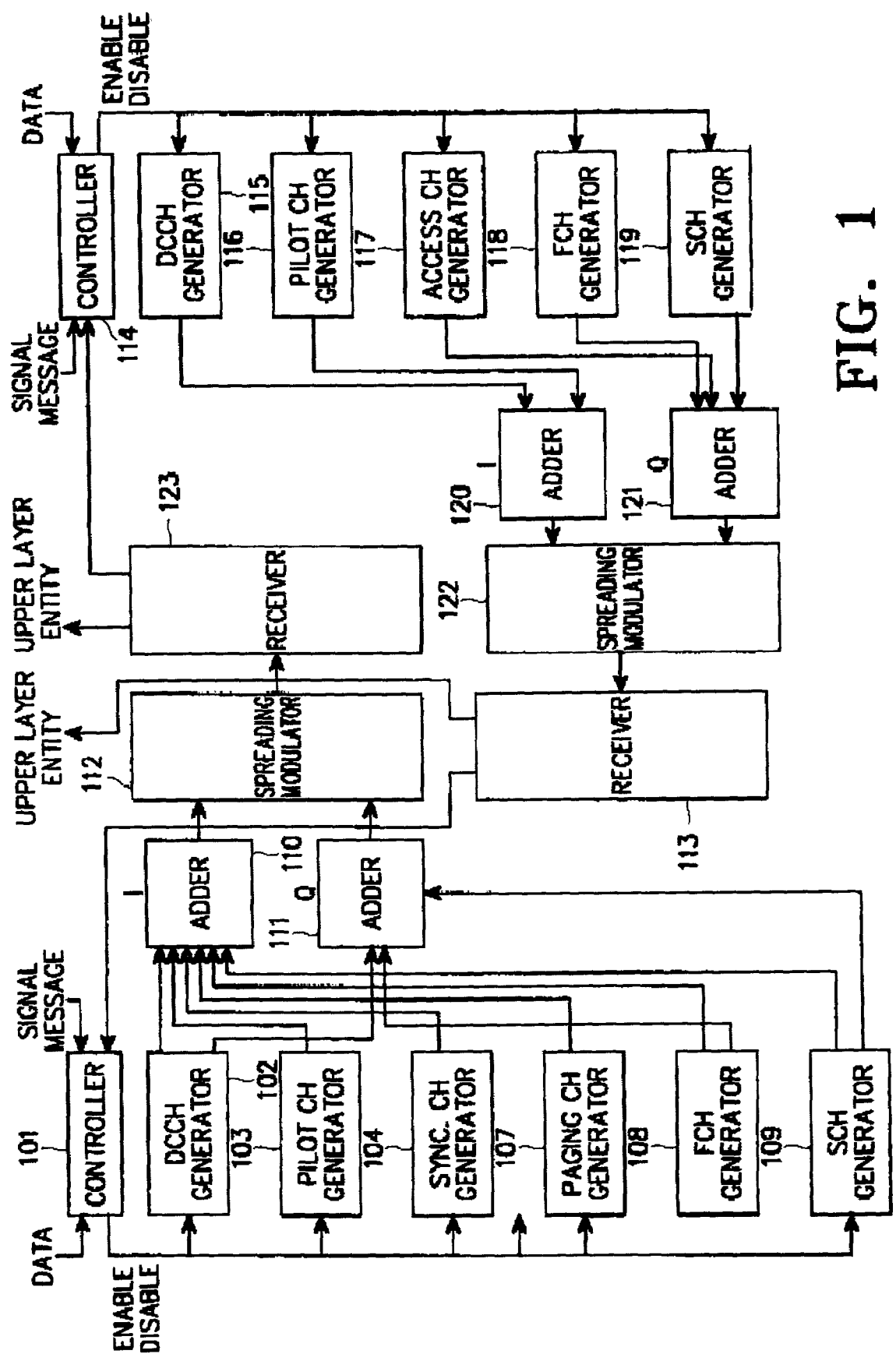
FIG. 1 is a schematic diagram illustrating the construction of a base station in a sync mobile communication system according to the prior art.
Figure 2:
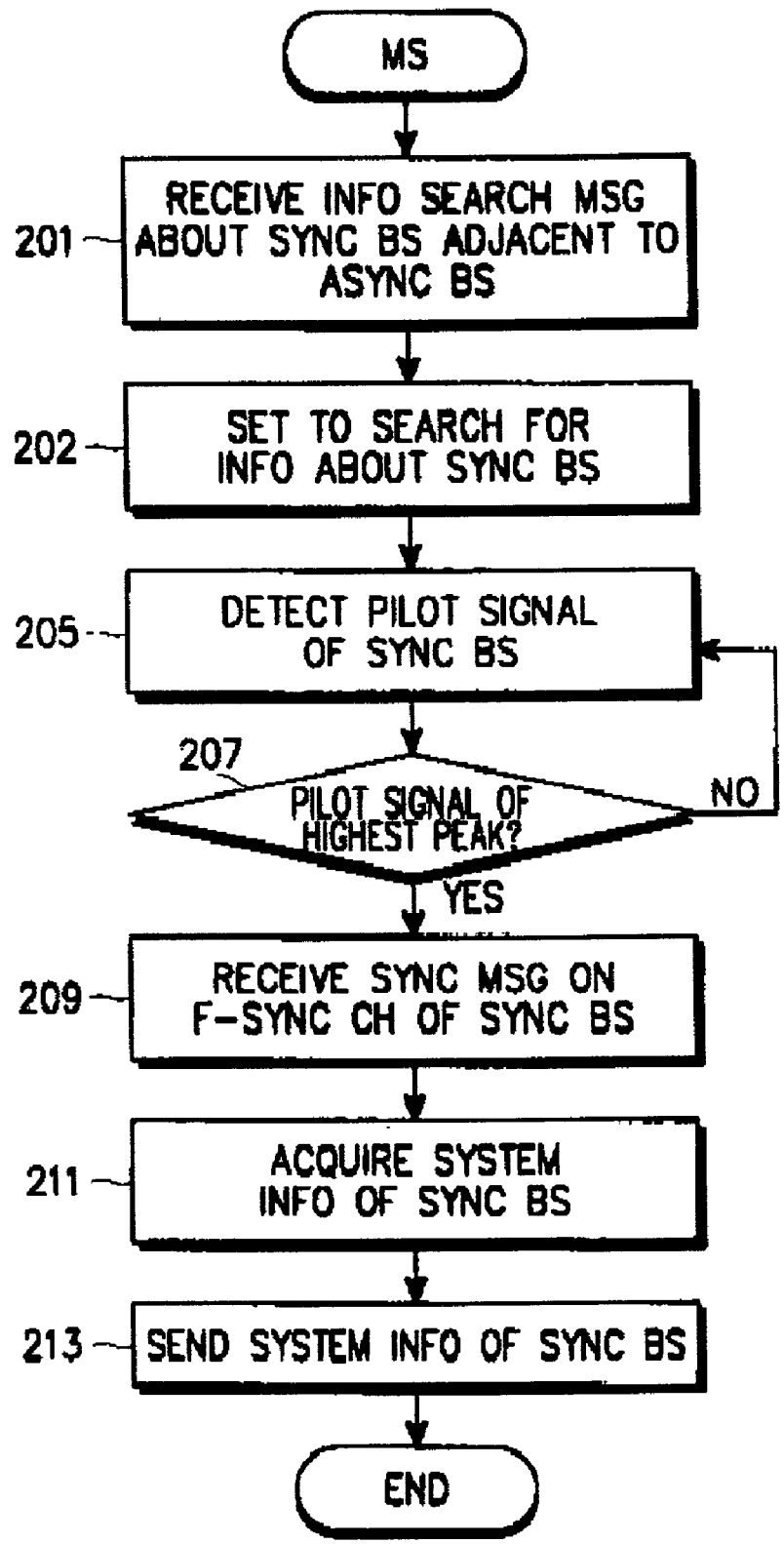
FIG. 2 is a flow chart illustrating a procedure for measuring information about a sync mobile communication system by a mobile station in communication with an async mobile communication system according to the prior art.

Preferred embodiments of the present invention will be described below with reference to the accompanying drawings. In the following description, well-known functions or constructions are not described in detail since they would obscure the invention in unnecessary detail. Like reference numbers denote the same components in the drawings.

By way of example, the present invention is illustrated in terms of a length of frames transmitted on the respective channels, a coding rate, and the number of data and symbols output from the blocks of the respective channels. It will be understood by those skilled in the art that the present invention is readily implemented without these particulars and with various changes.

The term "pseudo-noise (PN) short code" as used herein means a code with a chip period of $2^{15}$ (26.67 ms). As the timing varies from one base station to another, the mobile station has to search for the short code timing of a target cell whenever it receives a handoff request message. Here, the short code timing (i.e., PN offset) is information indicating how much the base station deviates from the reference time (or offset zero time). The mobile station can measure the reception strengths of the pilot signals from the base station simply from the knowledge about the reference time and the PN offset.

The term "PN long code" as used herein means a code with a chip period of $2^{42}$, which code is used to transmit forward traffic channels and reverse signals. The mobile station is in itself hard to acquire synchronization with this code. Thus the system has to provide the timing of the PN long code in the sync channel during the initialization step.

Figure 4:
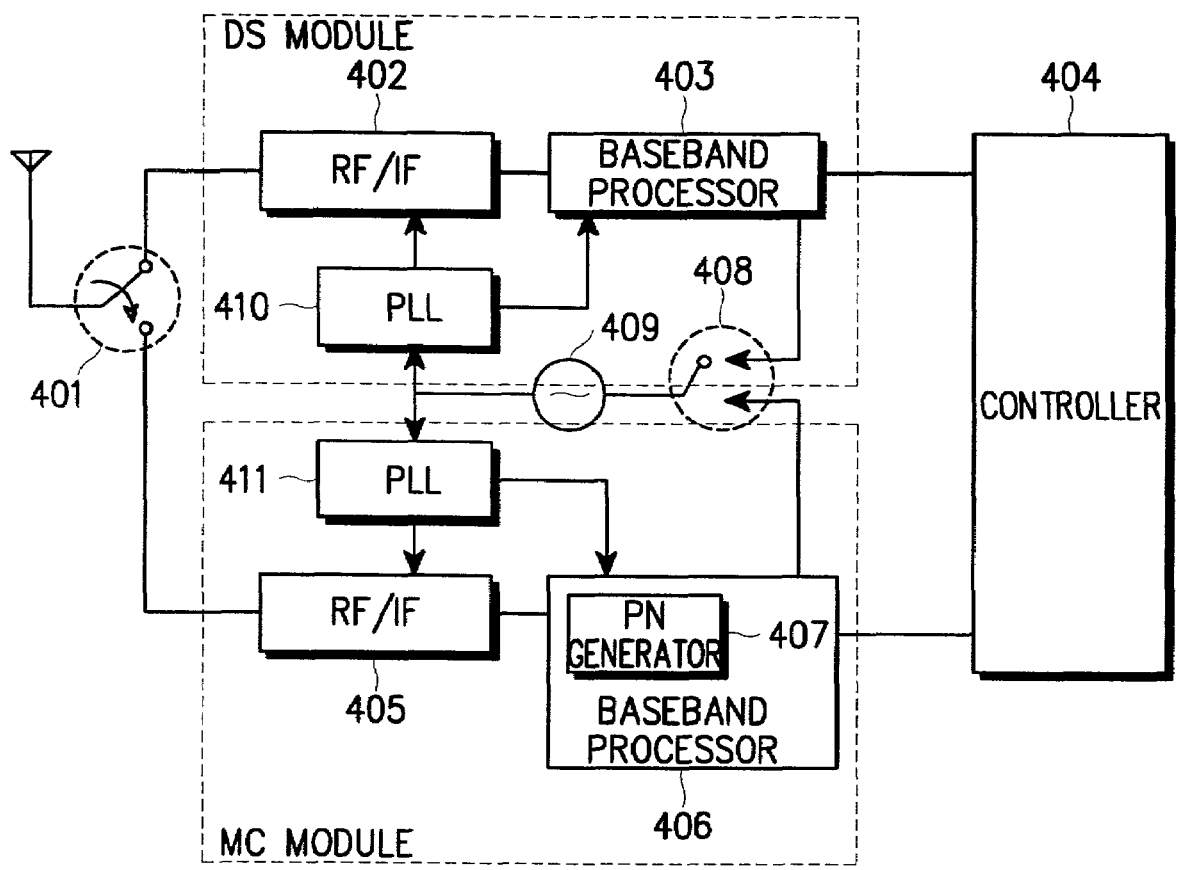
FIG. 4 is a schematic diagram illustrating the construction of a dual mode mobile station that is able to operate in both sync and async modes according to the present invention.

FIG. 4 is a diagram illustrating the construction of a mobile station that is able to communicate with both async and sync systems according to an embodiment of the present invention.

Referring to FIG. 4, switches 401 and 408 switch between direct spread (DS) and multi carrier (MC) modules according to the operational mode of the mobile station. A first radio frequency (RF/IF) section 402 multiplies a received signal from the async base station via the switch 401 by a carrier frequency signal from a first phase locked loop (PLL) 410 to perform frequency down-conversion to a baseband signal. A first baseband processor 403 demodulates the baseband signal from the first RF/IF section 402 by despreading. The first baseband processor 403 also provides a reference clock to a local generator 409 via the switch 408. The first RF/IF section 402 and the first baseband processor 403 are integrally referred to as an async module (or direct spread (DS) module). A controller 404 controls the overall operation of the mobile station. Also, the controller 404 processes a message from the base station and generates a message to be sent to the base station.

A second RF/IF section 405 multiplies a received signal from the sync base station via the switch 401 by a carrier frequency signal from a second PLL 411 to perform a frequency down-conversion to a baseband signal. A second baseband processor 406 demodulates the baseband signal from the second RF/IF section 405 by despreading. The second baseband processor 406 also provides a reference clock to the local generator 409 via the switch 408. The second baseband processor 406 includes a PN generator 407 and operates according to the timing of the sync system acquired for a given time period during communication with the async system in the present invention. The operation of the PN generator 407 continues even while the mobile station is in communication with the async system. The second RF/IF section 405 and the second baseband processor 406 are integrally referred to as a sync module (or multi carrier (MC) module). The local generator 409 supplies a local oscillation signal to the first PLL 410 and the second PLL 411 based on the reference clock from the first baseband processor 403 and the second baseband processor 406.

As described above, the mobile station has first and second RF/IF sections 402 and 405 and first and second baseband processors 403 and 406, respectively, for async (DS) and sync (MC) systems, which share the controller 404, the generator 409 and the antenna. Thus, the mobile station can select either the DC module or the MC module by way of the switches 401 and 408 according to the operational mode. When the mobile station is in communication with the async system, the first switch 401 is connected to the DS module. If the mobile station intends to acquire the timing of the sync system during an operation in the async system, it temporarily turns the first switch 401 to the MC module and, after acquiring the timing of the sync base station at the PN code generator 407 in the second baseband processor 406, reconnects the first switch 401 to the DS module. After acquiring the timing of the sync base station, the mobile station turns off the second baseband processor 406 and the second PLL 411 but the second RF/IF section 405 and the PN generator 407 and communicates with the async system using the DS module. Only the PN generator 407 continuously operates at the chip rate of the sync system. For that reason, the mobile station can maintain the acquired timing of the sync system during communication with the async system and successively update the timing whenever it searches for a new timing of the sync system.

Now, a description will be given regarding a procedure for acquiring the timing of a sync system by a mobile station in communication with an async system and then to a procedure for the mobile station performing a handoff from the async system to the sync system after acquiring the timing of the sync system.

Figure 5:
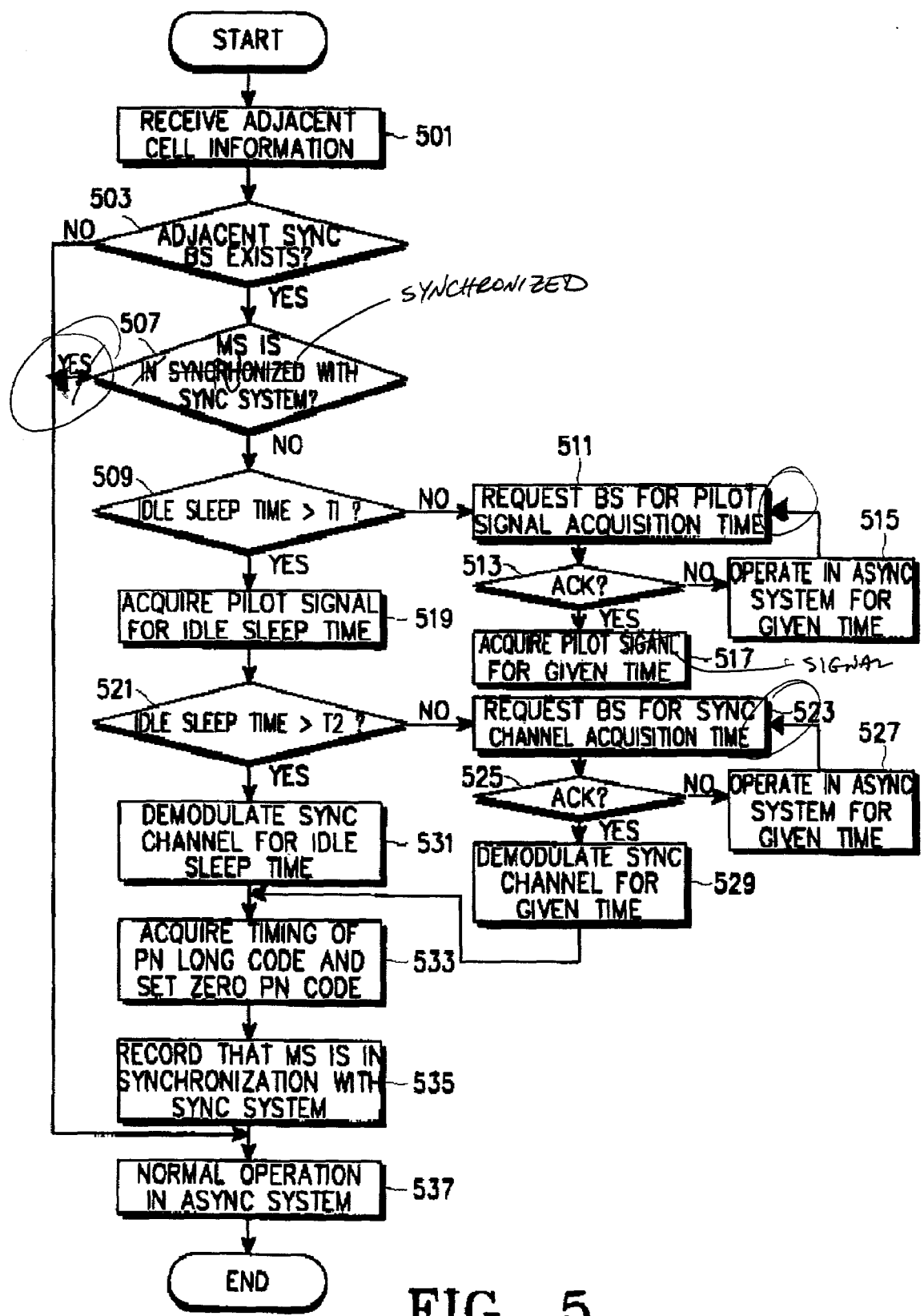
FIG. 5 is a flow chart illustrating a procedure for acquiring synchronization with a sync mobile communication system by the mobile station in communication with an async mobile communication system according to the present invention.

FIG. 5 is a flow chart illustrating a procedure for acquiring the timing of a sync system by a mobile station during communication with an async system according to the present invention.

Referring to FIG. 5, the mobile station receives information about the adjacent cells (i.e., adjacent base stations) or overlapped cells from the async base station, in step 501. The information about the adjacent (or overlapped) cells can be PN offsets and frequency bands in the case where the adjacent cells are sync base stations. In step 503, the mobile station analyzes the received information about the adjacent (or overlapped) cells to determine whether an adjacent sync system exists. If there exists an adjacent sync system, the mobile station turns to step 507 to check whether it has already acquired the timing of the sync system. If, at step 503, an adjacent (or overlapped) sync system does not exist, the process proceeds to step 537 and a normal operation in the async system is performed.

If it has acquired the timing of the sync system, the mobile station performs a normal operation in the async system at step 537; otherwise, it acquires the timing of the sync system. If in a traffic state, the mobile station requests the async base station for a compressed mode operation and then acquires the timing of the sync system using the compressed mode. The following description will be however given on the assumption that the mobile station is in the idle mode.

In the idle mode, the mobile station determines in step 509 whether the current idle sleep time is longer than the required pilot signal acquisition time T1. The pilot signal acquisition time T1 is properly determined according to the cell searching ability of the mobile station. If the current idle sleep time is longer than the pilot signal acquisition time T1, the mobile station proceeds to step 519 to enter the sync mode (or, enable the MC module) for the idle sleep time and acquire the pilot signal from the adjacent sync base station, thereby acquiring the short code timing of the sync system. Subsequently, the mobile station synchronizes a short code generator in the PN code generator 407 of FIG. 4 with the acquired short code timing.

If the current idle sleep time is shorter than the pilot signal acquisition time T1 or the mobile station is not in the idle mode, the flow of the procedure goes to step 511 in which the mobile station requests the async base station for the pilot signal acquisition time. Then, the mobile station determines in step 513 whether the request is granted, i.e., an acknowledgement (ACK) signal is received from the async base station. Upon receiving the ACK signal, the mobile station acquires the pilot signal for the given time and gets in synchronization with the PN short code, in step 517. Without the ACK signal, the mobile station performs a normal operation in the async system in step 515 and, after an elapse of a defined time, returns to step 511 to request the async base station for the pilot signal acquisition time again.

In the present invention, there may be two operating methods. A first method, as shown in FIG. 5, performs a PN long code synchronization of the sync system by the pilot signal acquisition of the base station and sync channel demodulation, at the same time. If the above method is impossible, a second method may be performed. The second method can be performed by separating the pilot signal acquisition of the base station from sync channel demodulation. In this case, after acquiring the pilot signal in steps 519 or 517, the process proceeds directly to step 537, performs a normal operation (sleep and wake up operation in a sync mode; while doing the processes, the pilot signal time is kept and goes to next sleep mode. Here, if the step 503 is "Yes", the process proceeds directly to step 521 and acquires a PN long code of the sync channel.

After acquiring synchronization with the PN short code, the mobile station determines in step 521 whether the current idle sleep time is longer than the sync channel demodulation time T2 of the sync system. The required sync channel demodulation time T2 is in the range of about 200 to 500 ms for the IS-95 system. If the current idle sleep time is longer than the sync channel demodulation time T2, the mobile station proceeds to step 531 to enter the sync mode for the idle sleep time and demodulate the sync channel of the sync system.

If the current idle sleep time is shorter than the sync channel demodulation time T2, the mobile station proceeds to step 523 to request the async base station for the sync channel demodulation time. Then, the mobile station checks in step 525 whether the request is granted, i.e., an ACK signal is received from the async base station. Upon receiving the ACK signal, the mobile station demodulates the sync channel for the given time, in step 529. Without the ACK signal, the mobile station performs a normal operation in the async system in step 527 and, after an elapse of a defined time, returns to step 523 to request the async base station for the sync channel demodulation time again. After demodulating the sync channel, the mobile station synchronizes the PN long code generator in the PN generator of FIG. 4 with the PN long code timing acquired by the demodulation, in step 533. The mobile station continues the operation of step 533 even when the operational mode is switched to the async system.

The synchronizations of the PN short code and the PN long code are not necessarily successive. When the idle sleep time is relatively short, the mobile station acquires the timing of the PN short code and, after returning to the async system mode, gets in synchronization with the PN long code in the next sleep interval. If the mobile station requests the async base station for the timing acquisition time, then the async base station temporarily controls the call signal period of the mobile station to assign the required timing acquisition time to the mobile station.

The mobile station records in the memory that it is registered in the sync system, in step 535, and performs a normal operation in the async system, in step 537. In FIG. 5, the procedure for acquiring the timing of the sync system using the pilot signal and the sync channel of the sync base station can be performed while the mobile station acquires the initial timing of the async system. The timing of the async system can be acquired during the idle sleep time, or using the compressed mode.

Now, a description will be given regarding an operation of the async base station in response to the action of the mobile station as illustrated in FIG. 5.

During transmission of information about the adjacent cells to the mobile station, the async base station informs the mobile station whether there exists a sync system among the adjacent cells. Upon receiving a request for the pilot signal acquisition time from the mobile station (in step 511 of FIG. 5), if possible according to the circumstances, the async base station sends an ACK signal to the mobile station and interrupts the signal transmission to the corresponding mobile station for a defined time so as to afford the pilot signal acquisition time to the mobile station.

When the mobile station is in communication, the async base station may indicate a compressed mode operation according to the channel environment. The async base station normally sends a non-acknowledgement (NACK) signal to the mobile station in cases where the mobile station is in communication or under a bad channel environment, it is not possible to assign the compressed mode for the required time, or it is not possible to assign the pilot signal acquisition time due to the presence of data to send in emergency.

Upon receiving a request for the sync channel demodulation time from the mobile station (in step 523 of FIG. 5), if possible according to the circumstances, the async base station sends an ACK signal to the mobile station and interrupts the signal transmission to the corresponding mobile station for a defined time so as to afford the sync channel demodulation time to the mobile station. If the mobile station is in communication at this time, the async base station may indicate a compressed mode operation according to the channel environment. The async base station normally sends an NACK signal to the mobile station in cases where the mobile station is in communication under a good channel environment, the compressed mode is not allowed during the required time, or the sync channel demodulation time cannot be assigned due to the presence of data to send in emergency.

Figure 6:
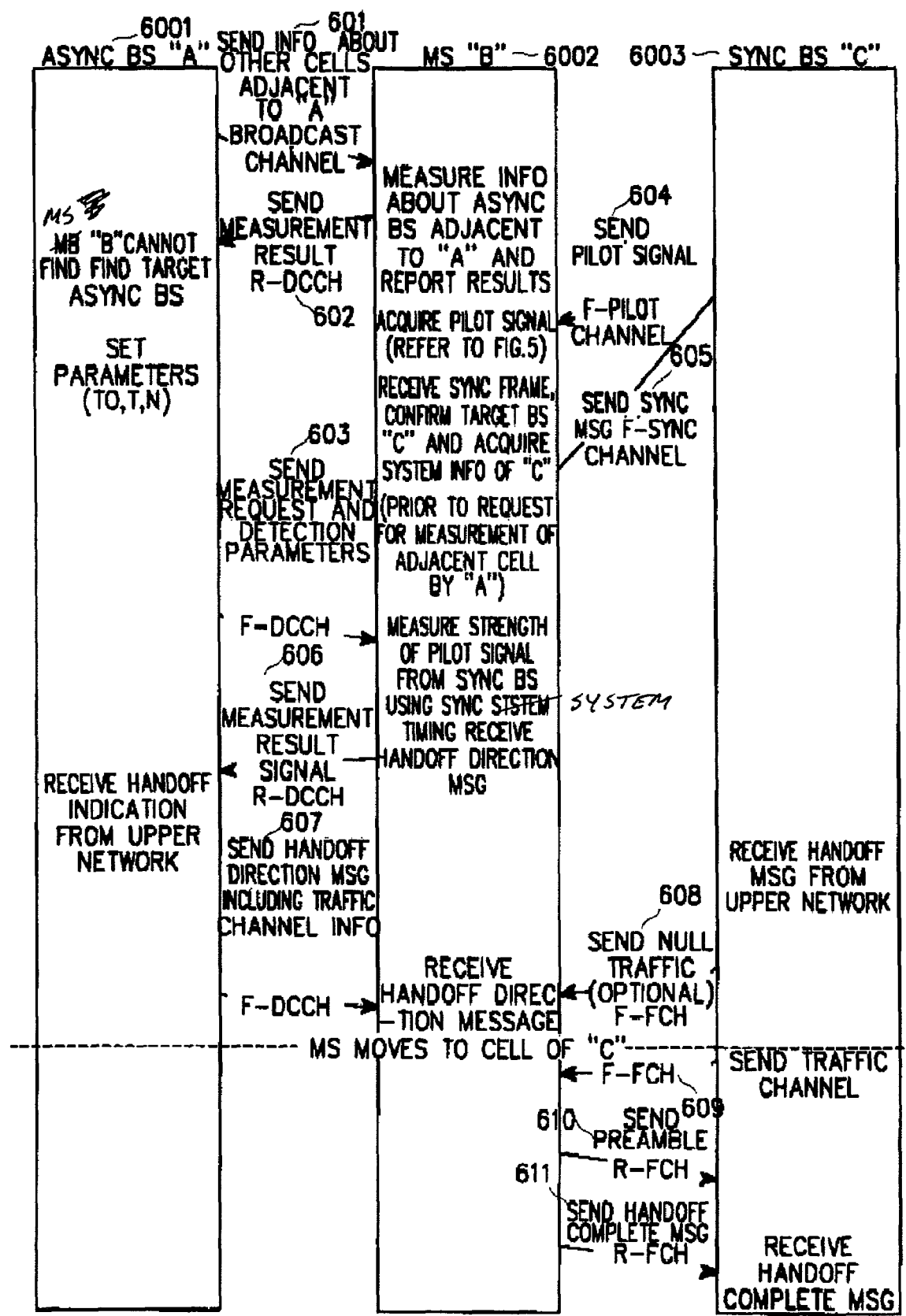
FIG. 6 is a diagram illustrating a procedure for the mobile station performing a handoff from an async base station to a sync base station.

FIG. 6 is a diagram illustrating a procedure that the mobile station operating in an async system acquires the timing of a sync system and then performs a handoff to the sync system. The handoff process where the mobile station has already acquired the timing of the sync base station as described in FIG. 5 is similar to the general process for performing a handoff to the sync system.

Referring to FIG. 6, the mobile station receives a message including information about the adjacent base stations from the async base station through a broadcast channel, in step 601. Here, the async base station sends to the mobile station information about the adjacent sync base stations together with the pilot offset PILOT_OFFSET and the frequency band of the individual sync base stations. In step 602, the mobile station measures the strengths of the pilot signals from the adjacent base stations using the received information about the adjacent base stations and sends a message including the measured strengths of the pilot signals to the async base station through the reverse dedicated channel periodically or by request.

During a normal operation in the async system, the mobile station acquires the pilot signal from the sync base station in the process as illustrated in FIG. 5, in step 604. As described above, the mobile station acquires the pilot signal by two methods: one is switching the operational mode for the idle sleep time to acquire the pilot signal, and the other is separately requesting the async base station for the pilot signal acquisition time and acquiring the pilot signal for the given time. If the mobile station is not in the idle mode, e.g., during communication, it acquires the pilot signal from the sync base station using the compressed mode. Upon acquiring the pilot signal, the mobile station synchronizes the PN short code generator in the PN code generator 407 of the MC module with the PN short code of the sync system.

After acquiring the pilot signal, the mobile station performs the procedure of FIG. 5 to demodulate the sync channel from the sync base station and analyze a sync message, in step 605. The sync message includes system information necessary for communication with the base station, such as system ID, network ID, PN_OFFSET value, information about the long code state after 320 ms, paging channel data rate, etc.

As described above, the mobile station demodulates the sync channel by two methods: one is switching the operational mode for the sleep time to demodulate the sync channel, and the other is separately requesting the async base station for the sync channel demodulation time and demodulating the sync channel for the given time. If the mobile station is not in the idle mode, e.g., during communication, it demodulates the sync channel from the sync base station using the compressed mode.

Upon acquiring the pilot signal, the mobile station synchronizes the PN long code generator in the PN code generator 407 of the MC module with the PN long code of the sync system. As described above, the mobile station can acquire the timing of the adjacent sync base station for a given time during an operation in the async system. The procedures of steps 604 and 605 are performed before the mobile station receives from the async base station a measurement parameter requesting the measurement of the sync base station.

The async base station analyzes the message received through the reverse dedicated channel and checks whether there exists another async base station to which the mobile station can perform a handoff. If there is another async base station, the async base station decides to perform the handoff; otherwise, the async base station sets parameters T, T0 and N for detection of the received strength of the pilot signal from the adjacent sync base station. The parameter T0 indicates the time to detect the pilot signal from the sync base station, T the time period for detection of the pilot signal from the sync base station, N the number of repeating times for detecting the pilot signal from the sync base station.

The mobile station receives a message including a measurement indication for the reception strengths of the pilot signals from the adjacent async and sync base stations and the above-set parameters through a forward dedicated control channel, in step 603. Upon receiving the message on the forward dedicated control channel, the mobile station measures the received strengths of the pilot signals from the adjacent sync and async base stations based on the parameters. Since the mobile station has already acquired the timing of the sync base station in steps 604 and 605, it detects the pilot signals for data collected in the compressed mode using the timing of the sync base station. That is, the mobile station, which has the knowledge about the reference zero offset timing, can measure the strengths of the pilot signals from the candidate cells in a short time.

When the maximum of the measured values exceeds the threshold, the timings of the PN short code and the PN long code in the mobile station are updated by an offset given based on the pilot signal. That is, if the actual phase difference between the reference timing and the pilot detection timing is different from an offset given by the base station, the PN short code timing and the PN long code timing in the mobile station are regulated such that the phase difference should be the same as the given offset.

The mobile station sends a message including the measured strengths of the pilot signals from the adjacent base stations and the sync message to the async base station through the reverse dedicated channel, in step 606. Then, the async mobile station analyzes the message received on the reverse dedicated channel and sends the measurement results to the upper network. The upper network checks the existence of a sync base station to which the mobile station performs a handoff, and sends to the async base station a handoff indication message including information necessary for the handoff.

The mobile station receives the handoff indication message, including traffic channel information for communication with the sync base station, from the async base station through the forward dedicated channel, in step 607. The handoff indication message includes information necessary for establishing traffic channels, such as traffic channel frequency band, channel division code, frame offset, service option, etc. Upon receiving the handoff indication message, the mobile station is ready to receive the traffic data of the sync base station with reference to the traffic channel information included in the message, and receives null traffic data or the like from the sync base station through a forward fundamental channel to check the stability of the channel, in step 608.

In step 609, the mobile station receives a traffic message from the sync base station through the forward fundamental channel while it travels to the cell of the sync base station. Thus the call in connection with the async base station gets in contact with the sync base station. Subsequently, the mobile station sends a preamble on the reverse fundamental channel in order to report the normal transmission state, in step 610, and then sends a handoff completion message to the sync base station, in step 611.

Figure 3:
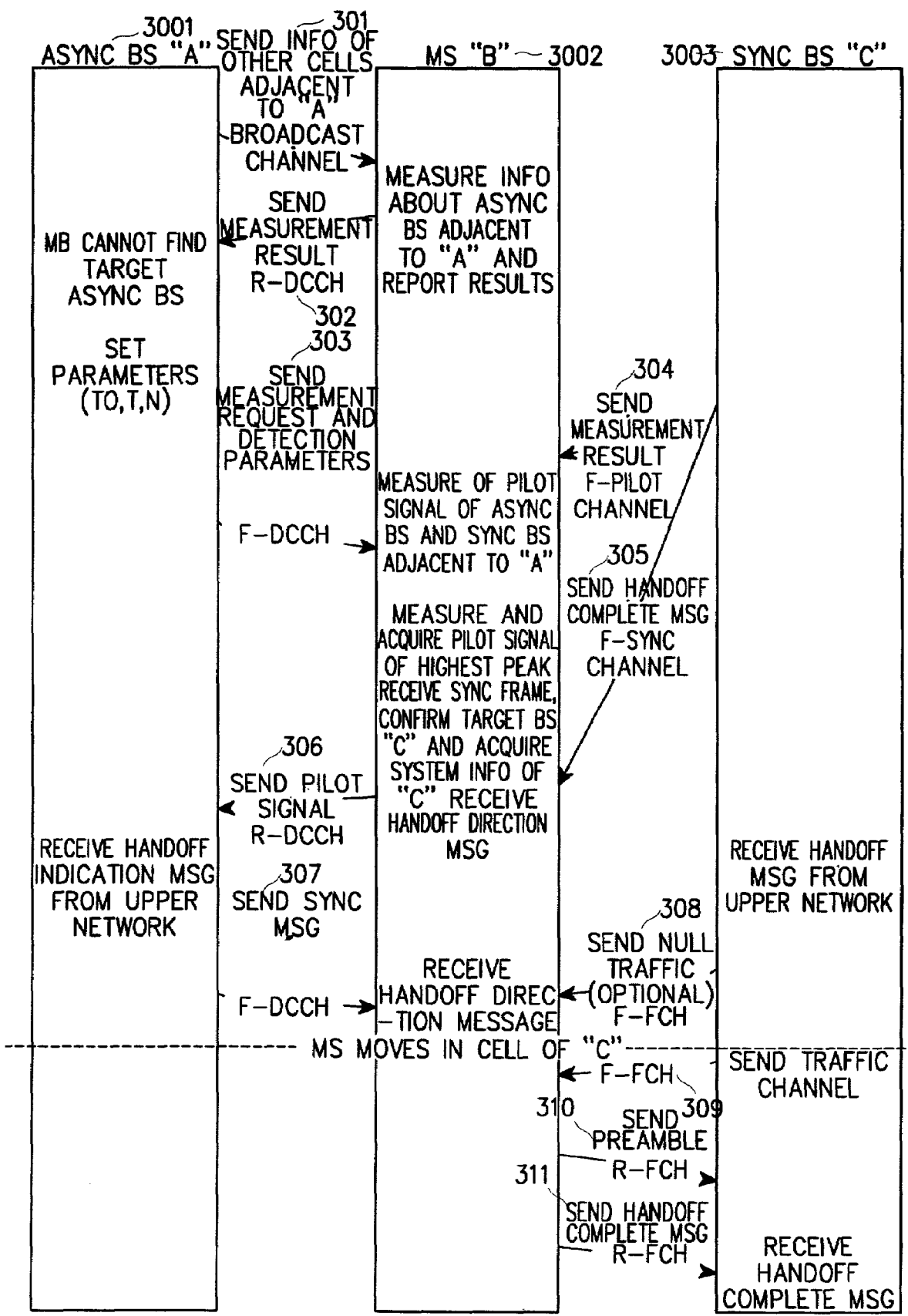
FIG. 3 is a diagram showing a procedure for the mobile station performing a handoff from an async base station to a sync base station according to the prior art.

The procedure of FIG. 6 is similar to that of FIG. 3 as previously described in the prior art, excepting that upon detecting the sync base station among the adjacent cells in step 601, the mobile station acquires and maintains in itself the timing of the sync system as described in FIG. 5 in steps 603 and 604 before the async base station requests for the measurement parameters of the sync base station, and then readily measures the strength of the pilot signal with the previously synchronized timing by the measurement request from the async base station.

As described above, the present invention allows the mobile station to acquire and maintain the timing of the sync system prior to receiving a handoff indication or an adjacent cell search indication in the mobile communication system in which both async and sync systems coexist. Consequently, upon receiving a search indication message for the adjacent sync cells from the async base station, the mobile station which has the knowledge of the zero offset time can search for the candidate cells with a small window size and send reliable search results to the base station in a shortest time, thereby reducing any potential risk of call disconnection.

Furthermore, upon receiving a handoff indication to the sync system, the mobile station which has the knowledge of the PN long code information and the pilot offset of the target cell can perform a handoff between async and sync systems in the level of the hard handoff occurring in the sync system. This secures a stable handoff without call disconnection.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A mobile station device, comprising:

an async demodulation module for converting a high-frequency signal from an async base station to a baseband signal and demodulating the baseband signal by despreading, said async demodulation module, comprising:

a first radio frequency section, and a first baseband processor;

a sync demodulation module for converting a high-frequency signal from a sync base station to a baseband signal and demodulating the baseband signal by despreading, said sync demodulation module, comprising:

a second radio frequency section, and a second baseband processor;

a switch for switching the received signal between the async and sync demodulation modules, said switch, comprising:

a first switch, and a second switch;

a controller for driving the sync demodulation module for a given time interval to acquire the timing of the sync base station during an operation in the cell of the async base station, and maintaining the acquired timing of the sync base station even after switching to the async demodulation module;

a first phase locked loop (PLL) for supplying a carrier frequency signal to the async demodulation module;

a second PLL for supplying a carrier frequency signal to the sync demodulation module; and a local generator for supplying a local oscillation signal based on a reference clock provided from the async demodulation module and sync demodulation module to the first PLL and the second PLL;

wherein said first switch operates to connect the received signal to one of the async demodulation module and the sync demodulation module, said second switch operates to connect the reference clock to a local generator, said first radio frequency section multiplies a received signal from the async base station via the first switch by a carrier frequency signal from a first phase locked loop (PLL) to perform frequency down-conversion to a baseband signal, said first baseband processor demodulates the baseband signal from the first radio frequency section by despreading, said second radio frequency section multiplies the received signal from the async base station via the first switch by a carrier frequency signal from a second phase locked loop (PLL) to perform frequency down-conversion to a baseband signal, and said second baseband processor enables the mobile station to operate according to the timing of the sync bases station acquired for a given time period during communication with the async base station, includes a PN generator that operates even while the mobile station is in communication with the async system, and demodulates the baseband signal from the second radio frequency section by despreading.

* * * * *